United States Patent

Inagawa et al.

[19]

[11] Patent Number: 6,073,202
[45] Date of Patent: Jun. 6, 2000

[54] BUS SWITCHING STRUCTURE AND COMPUTER

[75] Inventors: Takashi Inagawa, Owariasahi; Yoshiaki Hisada, Tajimi; Junya Ide, Owariasahi, all of Japan

[73] Assignee: Hitachi, Ltd., Tokyo, Japan

[21] Appl. No.: 09/135,729

[22] Filed: Aug. 18, 1998

[30] Foreign Application Priority Data

Aug. 18, 1919 [JP] Japan ..................................... 9-221388

[51] Int. Cl.[7] .............................. G06F 9/02; G06F 13/00; G06F 13/40; H04L 12/50; H03K 17/693

[52] U.S. Cl. .......................... 710/131; 710/100; 370/360; 370/402

[58] Field of Search .................................... 710/100, 101, 710/104, 107, 131, 132; 370/364, 438, 463, 351, 360, 402; 340/825.01, 825.8, 825.83; 714/4; 379/308; 709/220, 221, 223, 225, 253

[56] References Cited

U.S. PATENT DOCUMENTS

| | | |
|---|---|---|
| 4,893,301 | 1/1990 | Andrews et al. . |
| 4,933,846 | 6/1990 | Humphrey et al. . |
| 5,113,390 | 5/1992 | Hayashi et al. . |
| 5,365,512 | 11/1994 | Combs et al. . |
| 5,526,344 | 6/1996 | Diaz et al. . |

*Primary Examiner*—Gopal C. Ray
*Attorney, Agent, or Firm*—Antonelli, Terry, Stout & Kraus, LLP

[57] ABSTRACT

A bus switching structure and a computer using the same, wherein input/output (I/O) slot connections are switched to a desired I/O bus so that loads are distributed evenly over the I/O buses. The bus switching structure includes a switching unit and switching controller. The switching unit is located interposingly between an I/O slot and a plurality of I/O buses. The switching unit either connects or disconnects the I/O slot to or from each of the I/O buses in accordance with a switching signal. The switching controller outputs the switching signal to cause the switching unit to connect the I/O slot to one of the I/O buses and to disconnect the I/O slot from any of the other I/O bus, thereby effecting connection switchover between the I/O slot and the I/O buses.

13 Claims, 5 Drawing Sheets

SW7(~SW10) → [CONNECTING STATE OF SWITCH J1]
SW7(~SW10) → [CONNECTING STATE OF SWITCH J2]

| CONNECTIVE STATES OF SWITCHES | | | | PCI BUSES TO WHICH SLOTS ARE CONNECTED | | |
|---|---|---|---|---|---|---|
| SW7 | SW8 | SW9 | SW10 | SL10 | SL11 | SL12 |
| J1 | J1 | J1 | J2 | B2 | B2 | B2 |
| J1 | J1 | J2 | J1 | B2 | B2 | B3 |
| J1 | J2 | J1 | J1 | B2 | B3 | B3 |
| J1 | J2 | J2 | J2 | B2 | B3 | B2 |
| J2 | J1 | J1 | J1 | B3 | B3 | B3 |
| J2 | J1 | J2 | J2 | B3 | B3 | B2 |
| J2 | J2 | J1 | J2 | B3 | B2 | B2 |
| J2 | J2 | J2 | J1 | B3 | B2 | B3 |

BUS SWITCHING STRUCTURE AND COMPUTER

BACKGROUND OF THE INVENTION

The present invention relates to a bus switching structure and a computer using the bus switching structure. More particularly, the invention relates to techniques adapted advantageously to control connection of input/output (I/O) slots for use with Peripheral Component Interconnect (PCI) buses.

Computer systems, such as workstations and servers, increasingly are adopting a dual PCI bus arrangement to address high-speed processing requirements. An aim of implementing such a dual PCI bus arrangement is to distribute the loads evenly on the I/O buses thereof to enhance the performance of the entire computer system. This type of bus arrangement used on local buses in a computer system is discussed and illustrated in detail on pp. 70–71 in "The Latest PC Technologies" (Supplement to Nikkei Byte, a Japanese publication from Nikkei BP Co., Jun. 21, 1994). The publication describes features of the PCI bus.

Investigations and experiments of such bus arrangements led to the discovery of some problems specific to the dual PC bus arrangements intended for I/O bus load distribution. The major problems are as follows:

One problem occurs where each of a plurality of I/O devices is connected fixedly to one of two PCI buses. Thus, either of the PCI buses will tend to be more heavily burdened with loads depending on the frequency of use and duration of use of the particular PCI bus to which the I/O devices are connected then the other PCI bus. The unbalanced loads prevent the computer system from reaching its full potential.

Another problem occurs when, in accordance with actual use conditions, an operator attempts to rearrange the I/O slot connections to the PCI buses so that the two PCI buses will be used in a balanced manner. This, however, requires the operator to have specialized knowledge of computer hardware, particularly the disassembling of the enclosure of the computer system and the rearranging of cable connections. Further, rearranging I/O slot connections to balance the loads on the PCI busses takes time and effort. Worse, an error or mistake made during the rearrangement can disable the computer system or destroy its parts.

SUMMARY OF THE INVENTION

It is an object of the present invention to provide a bus switching apparatus and a computer for use with the bus switching apparatus which changes I/O slot connections to a desired I/O bus simply and in a short time depending on load fluctuations during actual use, such that loads are evenly distributed over I/O buses and the throughput of the computer is enhanced significantly.

In carrying out the invention and according to one aspect thereof, there is provided a bus switching structure including a switching unit and a switching controller. The switching unit is located interposingly between an I/O slot and a plurality of I/O buses. The switching unit either connects or disconnects the I/O slot to or from each of the I/O buses in accordance with a switching signal. The switching controller output the switching signal to cause the switching unit to connect the I/O slot to one of the I/O buses and to disconnect the I/O slot from any other I/O bus, thereby effecting connection switchover between the I/O slot and the I/O buses.

According to another aspect of the invention, there is provided a computer having a plurality of I/O buses, an I/O slot, and a bus switching apparatus for connecting the I/O slot to one of the I/O buses. The bus switching apparatus includes a switching unit located interposingly between the I/O slot and the I/O buses. The switching unit either connects or disconnects the I/O slot to or from each of the I/O buses in accordance with a switching signal. The bus switching apparatus also includes a switching controller which outputs the switching signal to cause the switching unit to connect the I/O slot to one of the I/O buses and to disconnect the I/O slot from the I/O bus, thereby effecting connection switchover between the I/O slot and the I/O buses.

With any of the inventive structures above, the switching controller need only perform switching operations of the switching unit to change the I/O slot connection to a desired I/O bus easily and in a short time.

According to a further aspect of the invention, there is provided a computer having a plurality of I/O buses, at least two I/O slots, and a bus switching apparatus for connecting the I/O slots to one of the I/O buses. The bus switching apparatus includes a plurality of switching units located interposingly between each of the I/O slots and the I/O buses. Each switching unit either connects or disconnects one of the I/O slots to or from one of the I/O buses in accordance with a switching signal. The bus switching apparatus also includes a switching controller which outputs the switching signal to cause the switching units to connect each of the I/O slots to one of the I/O buses and to disconnect the I/O slots from the I/O bus, thereby effecting connection switchover between the I/O slots and the I/O buses.

With the inventive structure above, the switching controller need only carry out switching operations of the switching units to increase or decrease flexibly the number of I/O slots connected to a desired I/O bus.

Any one of the above-described structures of the invention permits switching the I/O slot connection to a desired I/O bus easily, quickly and flexibly. This helps to increase the throughput of the computer. The inventive structures eliminate the need for disassembling the computer enclosure or rearranging cable connections at the time of changing I/O slot connections. Further there can be no mistakes or errors when performing rearrangement that would disable the computer or destroy its parts inadvertently is eliminated. Thus, by use of the invention, anyone without specialized knowledge of computer hardware can perform the switching of I/O slot connections.

BRIEF DESCRIPTION OF THE DRAWINGS

The scope of the present invention will be apparent from the following detailed description, when taken in conjunction with the accompanying drawings, and such detailed description and specific examples, while indicating preferred embodiments of the invention, are given by way of illustration only, since various changes and modifications within the spirit and scope of the invention will become apparent to those skilled in the art from this detailed description, in which.

DETAILED DESCRIPTION OF THE PREFERRED EMBODIMENTS

Preferred embodiments of the invention will now be described with reference to the accompanying drawings.

First Embodiment

Figure 1:
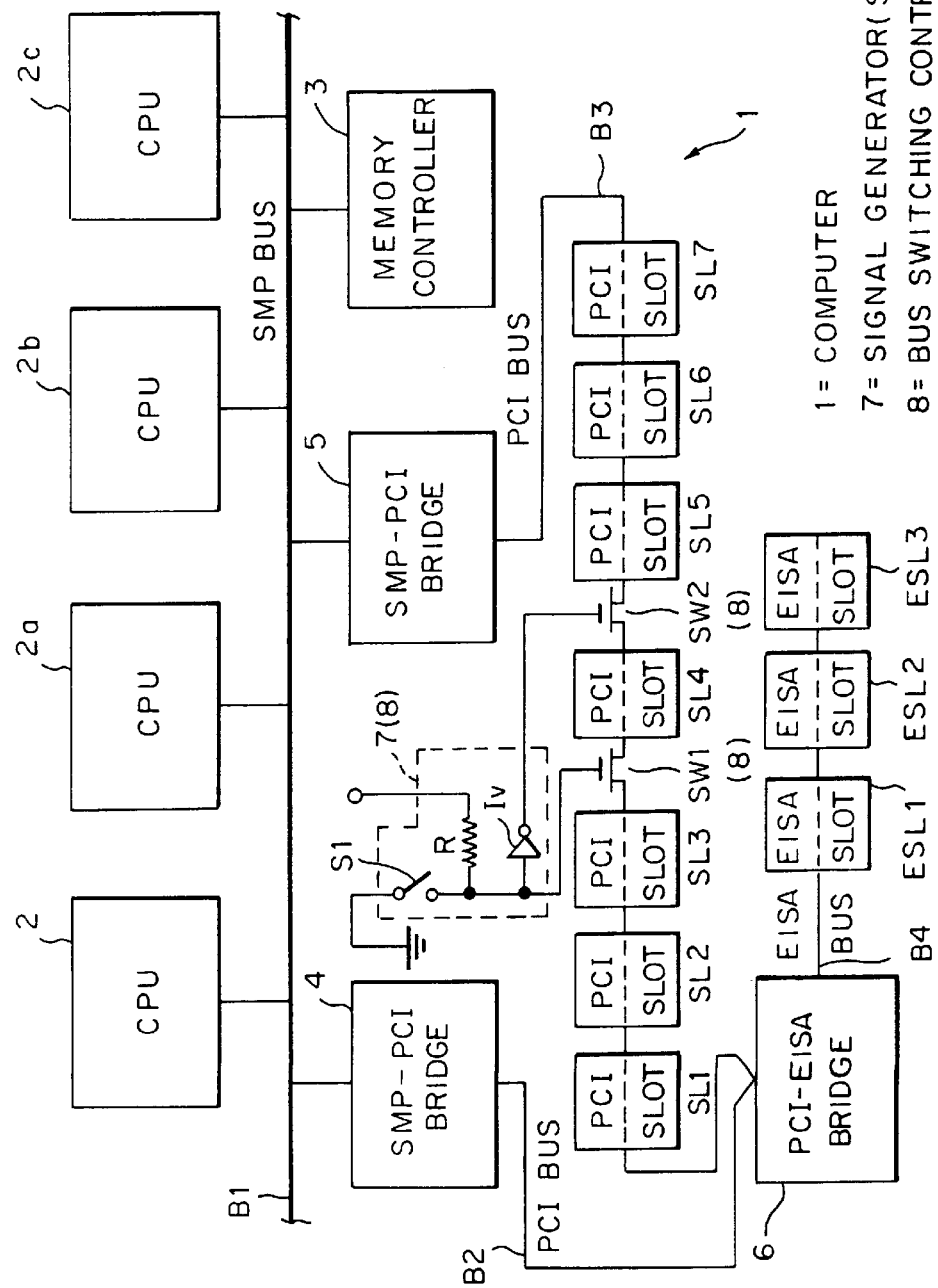
FIG. 1 is a schematic block diagram of a computer practiced as the first embodiment of the invention.
Figure 2:
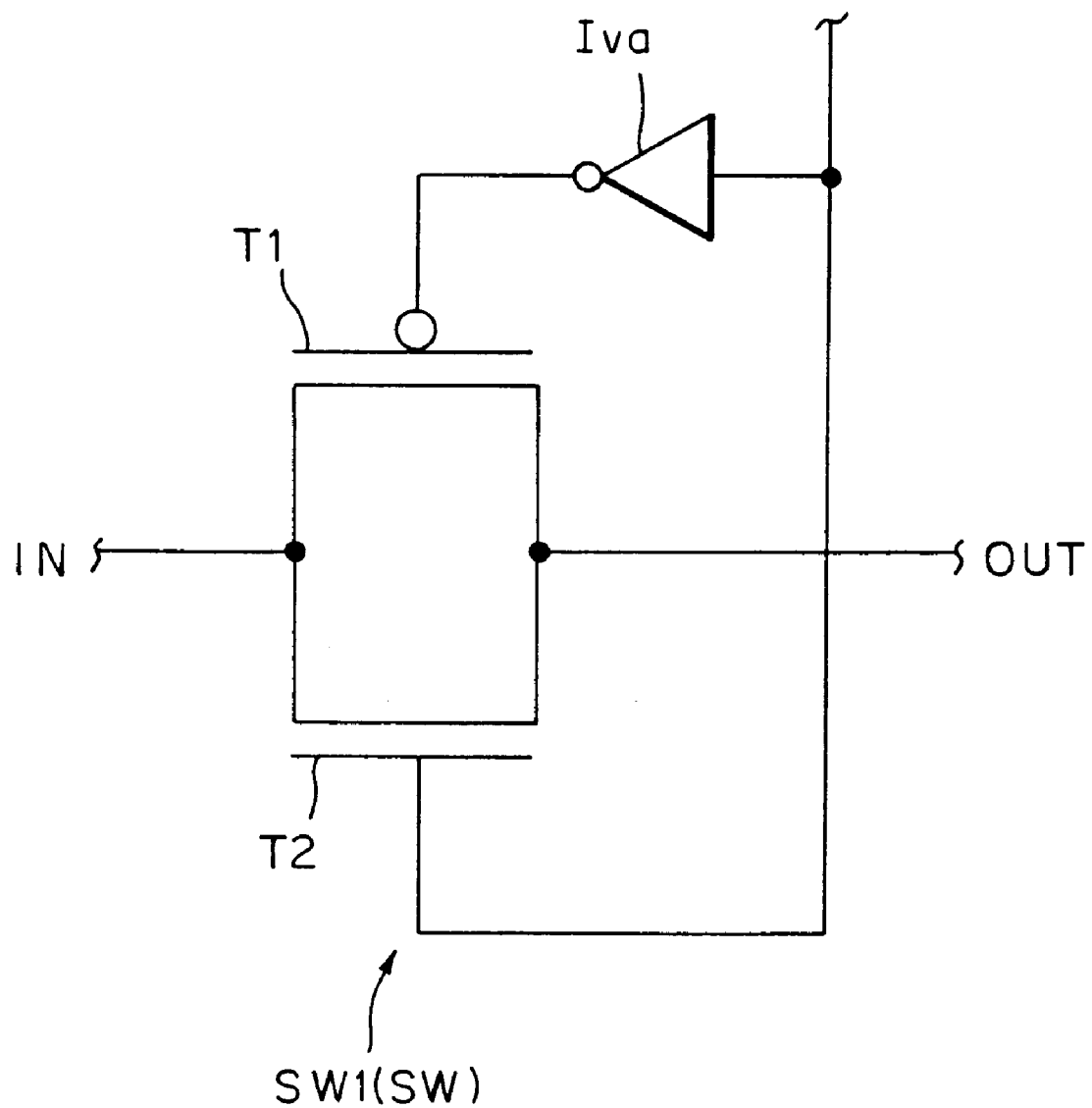
FIG. 2 is a schematic diagram of a switch included in the bus switching controller of the first embodiment.

FIG. 1 is a schematic block diagram of a computer practiced as a first embodiment of the invention. FIG. 2 is a schematic view of a switch included in bus switching controller of the first embodiment.

In the first embodiment, the computer 1 may illustratively be a workstation having a network function. The computer 1 includes four processors CPU 2 through CPU 2c. The CPUs are connected to an SMP bus B1 dedicated to processor use. The computer 1 further includes a memory controller 3 for controlling a main memory of the computer. The memory controller 3 is also connected to the SMP bus B1. In addition, the computer 1 has two PCI buses (I/O buses) B2 and B3 as well as SMP-PCI bridges 4 and 5. Bridges 4 and 5 carry out signal conversion between the SMP bus B1 and the PCI buses B2 and B3 respectively to ensure logical consistency therebetween. The PCI bus B2 is connected to the SMP bus B1 via the SMP-PCI bridge 4. The PCI bus B3 is connected to the SMP bus B1 through the SMP-PCI bridge 5.

The computer 1 has PCI slots SL1 through SL3 and SL5 through SL7 to accommodate I/O devices including peripherals. The PCI slots SL1 through SL3 are connected to the PCI bus B2, and the PCI slots SL5 through SL7 are connected to the PCI bus B3. Furthermore, the computer 1 has switches SW1 and SW2 (making up a switching unit). The PCI slot (I/O slot) SL4 is connected to either the PCI bus B2 or B3 via the switch SW1 or SW2.

As shown in FIG. 2, the switches SW1 and SW2 are each a complementary metal oxide semiconductor (CMOS) analog switch that consists only of a transistor T1 (P-channel MOS transistor), a transistor T2 (N-channel MOS transistor) and an inverter Iva, i.e., an electronic circuit to invert the signal input to the transistor T1. The switching unit of this construction reduces significantly leak currents and ON-state resistance.

The computer 1 also includes an EISA bus B4 and a PCI-EISA bridge 6 that performs signal conversion between the EISA bus B4 and the PCI bus B2 to ensure logical consistency therebetween. The EISA bus B4 is connected to the computer 1 through the PCI-EISA bridge 6. The computer 1 has EISA slots ESL1 through ESL3 to accommodate I/O devices such as peripherals. The EISA slots ESL1 through ESL3 are connected to the EISA bus B4.

The computer 1 further includes a signal generator (switching controller) 7 that generates signals to turn on and off the conductive state of each of the switches SW1 and SW2 in accordance with a predetermined signal input to the input terminal of each of the switches. The signal generator 7 is illustratively made up of a switch S1 (mechanical switching apparatus), a resistor R for limiting currents, and an inverter Iv. One connecting terminal of the resistor R is connected to a power supply.

One connecting terminal of the switch S1 is connected to ground potential. The other connecting terminal of the switch S1 is connected to the other connecting terminal of the resistor R, to the input terminal of the inverter Iv, and to the input terminal of the switch SW1. The output terminal of the inverter Iv is connected to the input terminal of the switch SW2. The switch S1, resistor R and inverter Iv constitute the signal generator 7. The signal generator 7 serves as bus switching controller 8. The switches SW1 and SW2 as well as the bus switching controlling means 8 make up a bus switching apparatus.

The following is a description of the operation of the first embodiment.

When the settings of the computer 1 are finished, an operator of the computer carries out benchmark tests to examine the computer performance in two cases: first when the PCI slot SL4 is connected to the PCI bus B2, and second when the PCI slot SL4 is connected to the PCI bus B3.

Described below is how to effect the different connections of the PCI slot SL4:

(1) When the PCI slot SL4 is to be connected to the PCI bus B2, the operator opens the switch S1. This causes a High-level signal to be input to the switch SW1 through the resistor R and a Low-level signal inverted by the inverter Iv to enter the switch SW2. The switch SW1 is turned on when supplied with the High-level signal, and the switch SW2 is turned off when supplied with the Low-level signal. The switch settings connect the PCI slot SL4 to the PCI bus B2.

(2) When the PCI slot SL4 is connected to the PCI bus B3, the operator closes the switch S1. This connects one connecting terminal of the resistor R to ground potential, thereby inputting the Low-level signal to the switch SW1. The High-level signal is input to the switch SW2 through the inverter Iv. The switch SW1 is turned off based on the Low-level signal and the switch SW2 is turned on based on the High-level signal. The switch settings connect the PCI slot SL4 to the PCI bus B3.

After benchmark tests to determine the balancing of the loads on the buses have been carried out in each of the above two cases, the operator compares the results and opts for the setup whose test results are the better of the two cases. For example, if the benchmark tests have yielded the better results when the PCI slot SL4 is connected to the PCI bus B2, then the switch S1 is placed in the nonconductive state. If the benchmark test results have been the better when the PCI slot SL4 is connected to the PCI bus B3, the switch S1 is put in the conductive state.

In the manner described, the switch S1 need only be put in the conductive or nonconductive state in order to switch connection of the PCI slot SL4 to one of the PCI buses B2 and B3 easily and in a short time. This allows the computer 1 to be used in an optimum working state. Because it is not necessary to perform such work as disassembling of the computer enclosure and cable connection rearrangements, there is no possibility of the computer 1 being disabled or its parts being destroyed by operator blunders or foul-ups. An operator with no specialized knowledge of hardware may set up the connection of the PCI slot SL4 in an optimum state easily and in a short time.

With the first embodiment, the signal generator 7 (FIG. 1) is composed of the switch S1, resistor R and inverter Iv. The switches SW1 and SW2 are turned on and off by operating the switch S1. Alternatively, the operation of the switches SW1 and SW2 may be effected not by hardware manipulation but by providing a flip-flop output signal to turn on and off the two switches as desired. In the alternative case above, the flip-flop output signal to alternate the switches SW1 and SW2 is provided by supplying software to establish a suitable flip-flop input signal.

Second Embodiment

Figure 3:
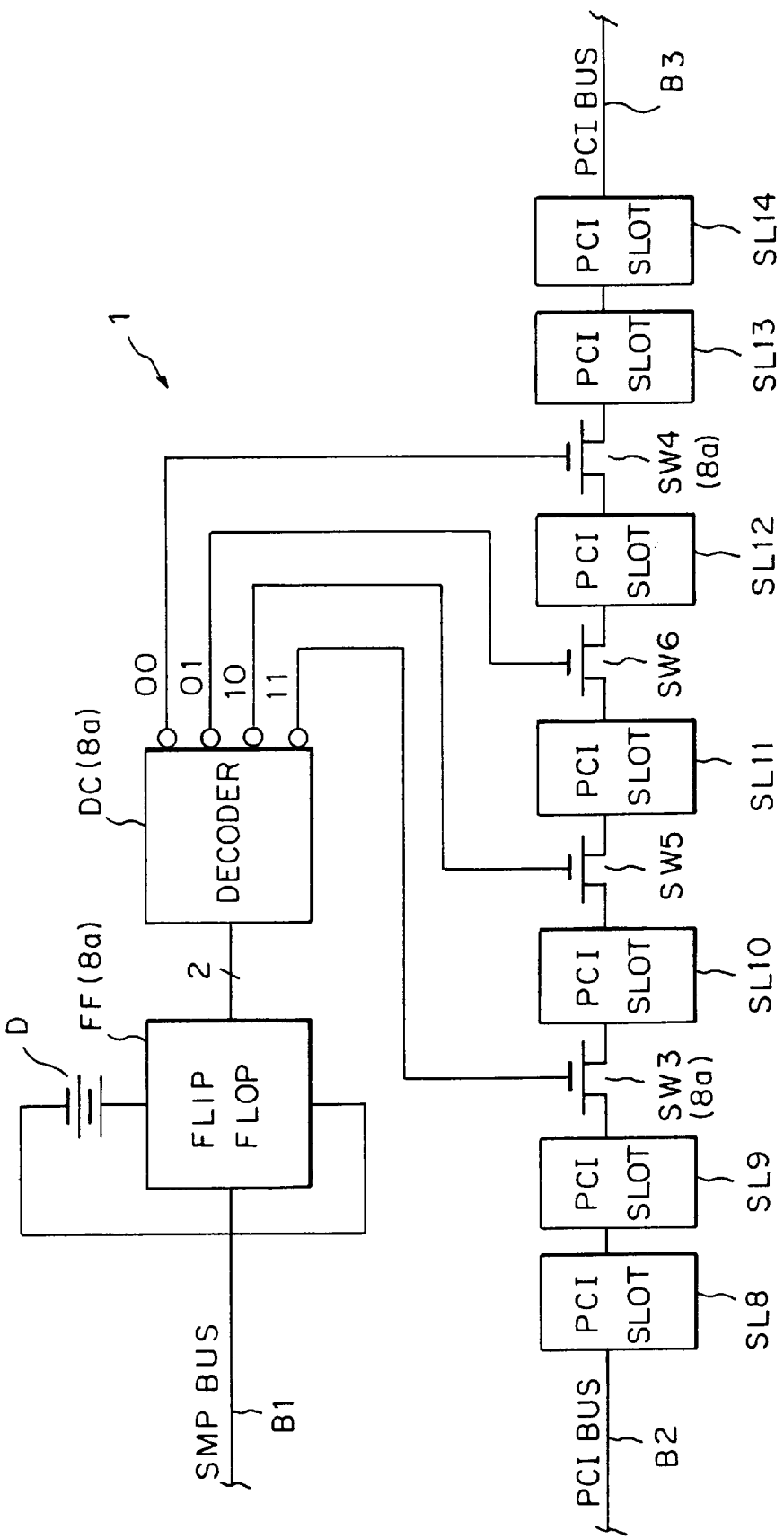
FIG. 3 is a block diagram of a computer practiced as the second embodiment of the invention wherein PCI slots are switched.

FIG. 3 is a block diagram of a computer practiced as a second embodiment of the invention wherein PCI slots are switched.

In the second embodiment, the computer 1 has a two-bit flip-flop (acting as a switching controller) FF. The flip-flop FF is connected to the SMP bus Bi and controlled by a CPU.

The computer 1 includes a power source D, a decoder DC, and switches SW3, SW4, SW5 and SW6 (e.g., CMOS analog switches). The power source D serves as a power supply to retain data set in the flip-flop FF. The decoder DC outputs a predetermined signal based on the data output by the flip-flop FF. The switches SW3 and SW4 constitute one switching unit, and the switches SW5 and SW6 make up another switching unit. The flip-flop FF, decoder DC, and switches SW3 and SW4 form bus switching controller 8a. The bus switching controller 8a and the switches SW3 through SW6 constitute a bus switching apparatus.

The computer 1 also includes PCI slots SL8, SL9, SL13, SL14, and PCI I/O slots SL10 through SL12. The PCI slots SL8 and SL9 are connected to the PCI bus B2. The PCI slots SL13 and SL14 are connected to the PCI bus B3. The switch SW3 is connected interposingly between the PCI slot SL9 and the PCI slot SL10. The switch SW5 is connected interposingly between the PCI slot SL10 and the PCI slot SL11.

The switch SW6 is connected interposingly between the PCI slot SL11 and the PCI slot SL12. The switch SW4 is connected interposingly between the PCI slot SL12 and the PCI slot SL13. The switches SW3 through SW6 are turned on and off on the basis of signals output by the decoder DC.

The following is a description of the operation of the second embodiment.

When the setting of the computer 1 is finished, the operator initializes the computer by storing information necessary for the start-up of the computer into its memory. With the computer started and placed under actual conditions of use, the operator carries out benchmark tests in four different cases:

(1) when the switchable PCI slots SL10 through SL12 are all connected to the PCI bus B2, (2) when the PCI slot SL10 is connected to the PCI bus B2 and the PCI slots SL11 and SL12 are connected to the PCI bus B3, (3) when the PCI slots SL10 and SL11 are connected to the PCI bus B2 and the PCI slot SL12 is connected to the PCI bus B3, and (4) when the switchable PCI slots SL10 through SL12 are all connected to the PCI bus B3. A check is made to see which of the four connective states is conducive to the most efficient computer performance.

Given the results of the benchmark tests, the operator chooses the connection setup that has proved to be most efficient. For example, if the flip-flop FF outputs a value of "00," "01," "10" or "11," the decoder DC outputs a Low-level signal corresponding to each value in question. Given any other value from the flip-flop FF, the decoder DC outputs a High-level signal.

Thus if the switch SW5 alone is turned off and the other switches SW3, SW4 and SW6 are turned on, then the PCI slot SL10 is connected to the PCI bus B2 and the PCI slots SL11 and SL12 are connected to the PCI bus B3. The connective states of the PCI slots SL8 through SL14 established ultimately following the benchmark tests, i.e., the data of the flip-flop FF, are held therein due to power being supplied to the flip-flop FF (backed up) by the power source D when the computer 1 is switched off.

With the second embodiment, the settings of the flip-flop FF may be changed by software upon start-up. This allows the connection settings of the PCI slots SL10 through SL12 to be altered easily and in a short time so that load fluctuations will be countered in a flexible manner.

Figure 4:
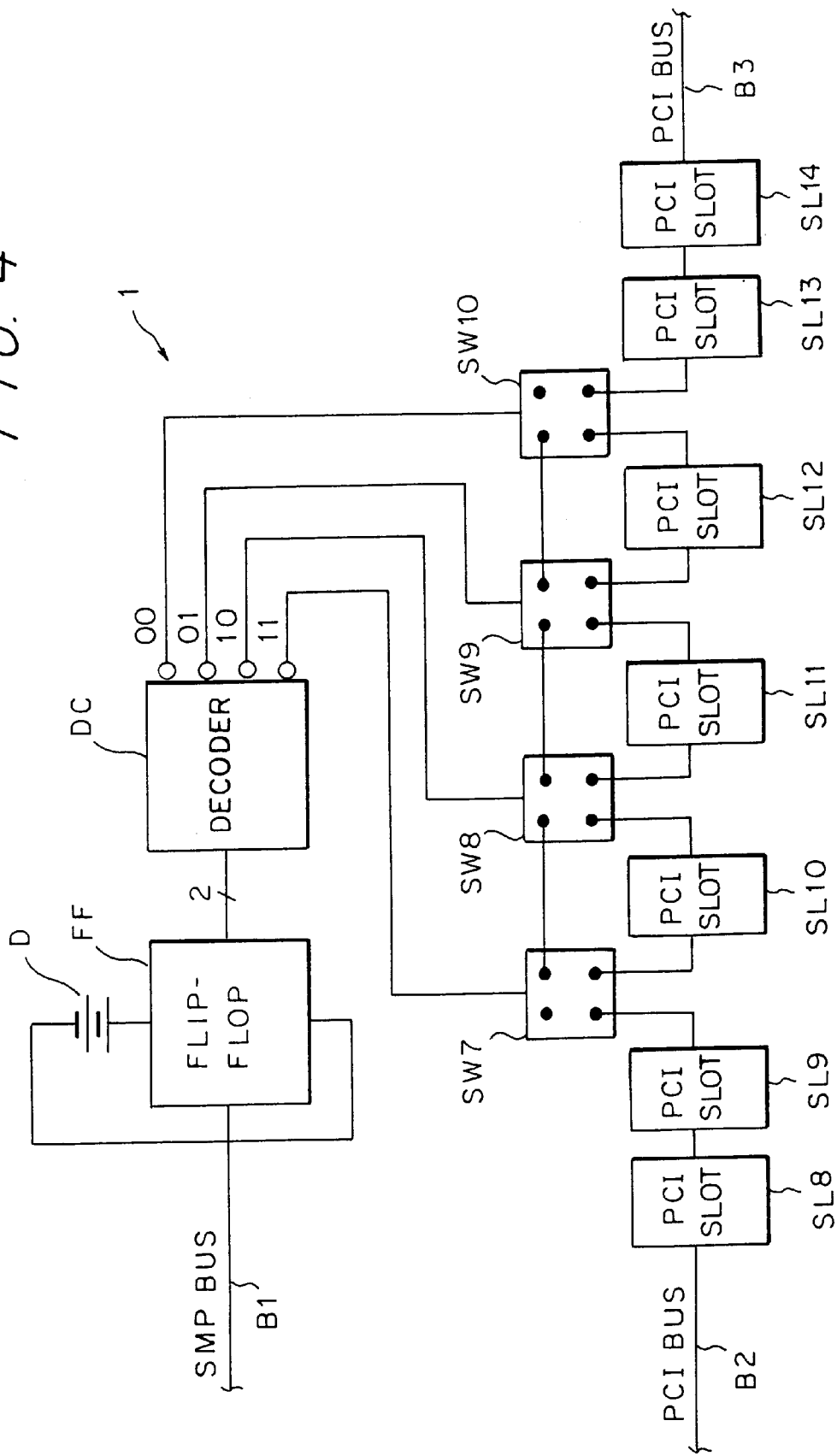
FIG. 4 is a schematic block diagram of a computer practiced as a variation of the invention.
Figures 5, 6:
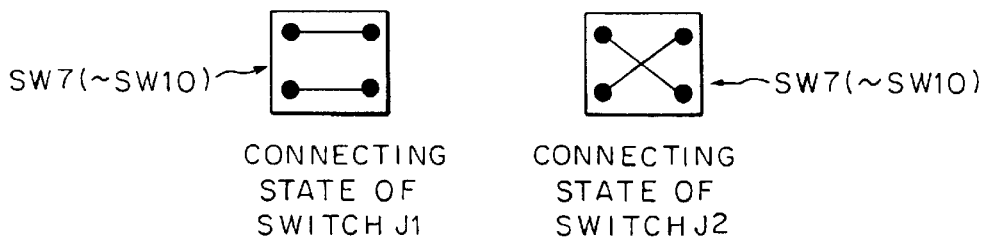
FIG. 5 is a schematic diagram of switches included in the bus switching controller for the variation of the invention.
FIG. 6 is a table of typical connective states of switches for the variation of the invention.

Alternatively, as illustrated in FIG. 4, the switchable PCI slots SL10 through SL12 may be connected by switches SW7 through SW10 to the decoder DC. This setup allows the decoder DC to control the connective states of the slots in the same manner as with the second embodiment. In the alternative case above, the switches SW7 through SW10 may each take one of two switching connections J1 and J2 shown in FIG. 5 under control of the decoder DC. Suitable combinations of the switches SW7 through SW10 with their appropriate connective states allow each of the PCI slots SL10 through SL12 to be connected to the desired PCI bus B2 or B3 as illustrated in the table of FIG. 6.

Although the description above contains many specificities, these should not be construed as limiting the scope of the invention but as merely providing illustrations of the presently preferred embodiments of this invention. It is to be understood that changes and variations may be made without departing from the spirit or scope of the invention.

For example, although the first and second embodiments above have been shown using semiconductor switches such as CMOS analog switches to change PCI slot connections, mechanical switches such as toggle switches and seesaw switches may be employed alternatively.

According to the invention:

(1) The connection of switchable I/O slots may be switched to an optimum I/O bus by a bus switching controller easily and in a short time;

(2) A switching controller including a flip-flop permits making connection changes by use of software, thereby allowing anyone without specialized knowledge of computer hardware is thus able to set up easily and quickly I/O slot connections in an optimum state; and (3) The advantages described in (1) and (2) above eliminate the need for carrying out the disassembly of the computer enclosure or the rearranging of cable connections, thereby removing the possibility of the computer being disabled or its parts being destroyed by errors committed during such work, and addressing load fluctuations on the computer in a flexible manner to significantly enhance computer throughput.

While the present invention has been described in detail and pictorially in the accompanying drawings, it is not limited to such details since many changes and modification recognizable to these of ordinary skill in the art may be made to the invention without departing from the spirit and scope of the invention, and all such modifications as would be obvious to one skilled in the art are intended to be included within the scope of the following claims.

We claim:

1. A computer comprising:

a CPU;

a processor bus which connects the CPU;

first and second bridge circuits, which are coupled to a processor bus, for transferring a signal between the processor bus and other busses;

a first input/output (I/O) bus which is connected to the first bridge circuit;

a second I/O bus which is connected to the second bridge circuit;

a slot which is connected to the first and second I/O busses;

a first switch inserted between the slot and the first I/O bus;

a second switch inserted between the slot and the second I/O bus; and a bus switching control circuit for controlling the first and second switches to electrically connect the slot to one of the first and second busses.

2. A computer according to claim 1, wherein the first and second switches are complementary metal oxide semiconductor (CMOS) switches.

3. A computer according to claim 1, wherein said bus switching control circuit comprises:

an input circuit for inputting a switching instruction; and a switching circuit for acting on the first and second switches according to the instruction.

4. A computer according to claim 3, wherein said input circuit is a mechanical switch.

5. A computer according to claim 3, wherein said input circuit is re-writable memory circuit.

6. A bus switching structure comprising:

a first and a second bus for transferring a signal;

a first slot which is connected to the first bus;

a second slot which is connected to the second bus;

a third slot which is connected to the first and second busses via switches; and a bus switching control circuit for controlling the switches to electrically connect the third slot to one of the first and second busses.

7. A bus switching structure according to claim 6, wherein said switches are CMOS switches.

8. A bus switching structure according to claim 6, wherein said bus switching control circuit comprises:

an input circuit for inputting a switching instruction; and a switching circuit for acting on said switches according to the instruction.

9. A bus switching structure according to claim 8, wherein said input circuit is a mechanical switch.

10. A bus switching structure according to claim 8, wherein said input circuit is re-writable memory circuit.

11. A computer comprising:

a CPU;

a processor bus which is connected to the CPU;

first and second bridge circuits for transferring a signal between the processor bus and other busses;

an I/O bus which is connected to the first and the second bridge circuits, said I/O bus comprises:

first and second switches, a first slot disposed between the first bridge circuit and the first switch, a second slot disposed between the first and second switch, and a third slot disposed between the second switch and the second bridge circuit; and a switch control circuit for controlling the first and second switches such that said second switch operates inverse to said first switch.

12. A bus switching structure comprising:

a bus for connecting first and second bridge circuits, said bus comprises:

first and second switches, a first slot disposed between the first bridge circuit and the first switch, a second slot disposed between the first and second switches, and a third slot disposed between the second switch and the second bridge circuit; and a switch control circuit for controlling said first and second switches such that said second switch operates inverse to said first switch.

13. A computer comprising:

a CPU;

a processor bus;

first and second bridge circuits coupled to said processor bus;

a first I/O bus which is connected to said first bridge circuit;

a second I/O bus which is connected to said second bridge circuit;

a first slot which is connected to said first I/O bus;

a second slot which is connected to said second I/O bus; and a third slot which is connected to one of said first and second busses alternatively.

* * * * *